United States Patent
Mellet et al.

(10) Patent No.: US 7,118,643 B1
(45) Date of Patent: Oct. 10, 2006

(54) METHOD OF MAKING TIRE WITH EXO-BELT SKIN

(75) Inventors: Yann Mellet, Philadelphia, PA (US); Josh Deetz, Taiping (TW)

(73) Assignee: Sweetskinz, Inc., Philadelphia, PA (US)

( * ) Notice: Subject to any disclaimer, the term of this patent is extended or adjusted under 35 U.S.C. 154(b) by 109 days.

(21) Appl. No.: 10/253,837

(22) Filed: Sep. 24, 2002

Related U.S. Application Data

(60) Provisional application No. 60/325,523, filed on Sep. 28, 2001.

(51) Int. Cl.
*B29D 30/08* (2006.01)
*B29D 30/52* (2006.01)
*B29D 30/56* (2006.01)
*B60C 1/00* (2006.01)
*B60C 9/12* (2006.01)
*B60C 11/00* (2006.01)

(52) U.S. Cl. ............... 156/114; 152/209.4; 152/209.5; 152/209.6; 152/209.11; 152/458; 152/524; 152/525; 156/116; 156/128.6; 156/130.5

(58) Field of Classification Search ............ 152/154.2, 152/169, 173, 175, 176, 178, 179, 185, 187, 152/188, 190, 191, 209.5, 209.11, 209.6, 152/209.4, 458, 524, 525; 156/123, 128.1, 156/128.6, 130.5, 129, 114, 116; 425/40–42
See application file for complete search history.

(56) References Cited

U.S. PATENT DOCUMENTS

| | | | |
|---|---|---|---|
| 822,307 A | 6/1906 | Scarborough et al. | |
| 844,820 A * | 2/1907 | Marks ..................... | 156/128.6 |
| 1,311,750 A | 7/1919 | Brashear | |
| 1,897,974 A | 2/1933 | Wolf | |
| 2,188,866 A | 1/1940 | Poschel | |
| 3,399,257 A | 8/1968 | Ueno | |
| 3,770,040 A | 11/1973 | De Cicco | |
| 3,813,257 A * | 5/1974 | West ...................... | 428/423.9 |
| 3,833,040 A | 9/1974 | Bins | |
| 3,865,663 A * | 2/1975 | Oka ......................... | 156/116 |
| 3,946,782 A | 3/1976 | Petrasek et al. | |
| 4,139,405 A * | 2/1979 | Seiberling ............... | 156/130.5 |
| 4,176,702 A * | 12/1979 | Seiberling ............... | 156/128.6 |
| 4,226,274 A | 10/1980 | Awaya et al. | |
| 4,308,083 A * | 12/1981 | Toth, Jr. .................. | 156/129 |
| 4,515,541 A * | 5/1985 | Salvadori ................. | 425/40 |
| 4,815,513 A | 3/1989 | Hirakawa | |

(Continued)

FOREIGN PATENT DOCUMENTS

AT    136525    2/1934

(Continued)

*Primary Examiner*—Steven D. Maki
(74) *Attorney, Agent, or Firm*—Akin Gump Strauss Hauer & Feld, LLP

(57) ABSTRACT

The present invention, in one embodiment, is a method of making a tire with a skin covering at least a portion of the outer peripheral surface of the tire. In practicing the method, a partially cured tire and a partially cured skin are provided. The partially cured tire and the partially cured skin are installed in a tire mold with the skin engaging and covering at least a part of the outer surface of the tire and with the skin facing an inner surface of the mold. Heat and pressure are applied to the tire to press the skin and the tire against the inner surface of the mold. The heat and pressure are maintained for a predetermined time period to vulcanize and bond together the tire and the skin.

11 Claims, 4 Drawing Sheets

U.S. PATENT DOCUMENTS

| | | | |
|---|---|---|---|
| 4,913,762 A | | 4/1990 | Kittler |
| 4,967,818 A | | 11/1990 | Gartland et al. |
| 5,050,342 A | | 9/1991 | Figueroa |
| 5,055,347 A | | 10/1991 | Bacon, Jr. |
| 5,058,647 A | | 10/1991 | Gartland et al. |
| 5,152,584 A | | 10/1992 | Maxwell, Jr. |
| 5,173,136 A | * | 12/1992 | Agarwal et al. ......... 152/209.4 |
| 5,267,596 A | | 12/1993 | Logar et al. |
| H1283 H | | 2/1994 | Porto et al. |
| 5,300,164 A | | 4/1994 | DeTrano et al. |
| 5,303,758 A | | 4/1994 | Clementz et al. |
| 5,478,426 A | | 12/1995 | Wiler et al. |
| 5,513,683 A | * | 5/1996 | Causa et al. ............. 152/209.4 |
| 5,614,041 A | | 3/1997 | Dumke et al. |
| 5,624,509 A | | 4/1997 | Stanley |
| 5,645,660 A | | 7/1997 | Attinello et al. |
| 5,645,661 A | | 7/1997 | Clementz et al. |
| 5,807,446 A | | 9/1998 | Ratliff, Jr. |
| D401,897 S | | 12/1998 | Bohlen |
| 5,843,268 A | | 12/1998 | Lyden et al. |
| 5,904,794 A | | 5/1999 | Boissonnet et al. |
| 6,093,271 A | * | 7/2000 | Majumdar ................... 156/116 |
| 6,406,575 B1 | | 6/2002 | Baumgarten et al. |
| 2003/0127170 A1 | * | 7/2003 | Cottin et al. ................ 152/524 |
| 2004/0108035 A1 | * | 6/2004 | Majumdar ............... 152/209.6 |
| 2004/0118496 A1 | * | 6/2004 | Vannan et al. ........... 152/209.5 |
| 2005/0000616 A1 | * | 1/2005 | Frantz et al. ................ 156/116 |

FOREIGN PATENT DOCUMENTS

| | | | |
|---|---|---|---|
| CA | 547958 | | 10/1957 |
| CA | 2212021 | * | 7/1998 |
| DE | 9102607.5 | * | 7/1991 |
| DE | 296 07 231 U1 | | 7/1996 |
| DE | 19630586 | * | 2/1998 |
| EP | 0 667 251 A1 | | 8/1995 |
| EP | 1027982 A2 | | 8/2000 |
| EP | 1027983 A3 | | 8/2000 |
| FR | 560285 | | 10/1923 |
| GB | 184107 | | 10/1922 |
| GB | 406896 | | 3/1934 |
| JP | 61-1446605 A | | 7/1986 |
| JP | 62-072773 | * | 4/1987 |
| JP | 63-17103 | | 6/1988 |
| JP | 3-54004 | | 5/1991 |
| JP | 4-202339 | * | 7/1992 |
| JP | 05104911 A | | 4/1993 |
| JP | 6-99705 A | | 4/1994 |
| JP | 6-262910 A | | 9/1994 |
| JP | 08318715 A | | 12/1996 |
| JP | 11-139109 | * | 5/1999 |
| JP | 11151908 A | | 6/1999 |
| SU | 212077 | * | 5/1976 |
| WO | WO 01/43958 | * | 6/2001 |

* cited by examiner

METHOD OF MAKING TIRE WITH EXO-BELT SKIN

CROSS-REFERENCE TO RELATED APPLICATIONS

The present application claims the benefit of U.S. Provisional Patent Application No. 60/325,523, filed Sep. 28, 2001 and entitled "Decorative Tire", the entire subject matter of which is hereby incorporated herein by reference.

BACKGROUND OF THE INVENTION

The present invention relates generally to tire enhancement and, more particularly, to a tire having an exo-belt cover or skin incorporated into at least a portion of the peripheral surface thereof.

BRIEF SUMMARY OF THE INVENTION

Briefly stated, in one embodiment, the present invention comprises a method of making a tire with a skin covering at least a portion of the outer peripheral surface of the tire. The method comprises the steps of: providing a partially cured tire; providing a partially cured skin; installing the partially cured tire and the partially cured skin in a tire mold with the skin engaging and covering at least a portion of an outer surface of the tire and with the skin facing an inner surface of the mold; applying heat and pressure to the tire to press the skin and the tire against the inner surface of the mold; and maintaining the heat and pressure for a predetermined time period to vulcanize and bond together the tire and the skin.

The present invention further comprises a tire assembly. The tire assembly includes a partially cured tire formed of a first predetermined rubber composition. A partially cured skin is formed of a second predetermined rubber composition. The second predetermined rubber composition is substantially the same as the first predetermined rubber composition. The partially cured skin is at least slightly larger than the partially cured tire and surrounds and engages at least a portion of the outer periphery of the partially cured tire. The partially cured tire and the partially cured skin are cured together as a single unit to bond the skin to the tire to form the tire assembly.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention there are shown in the drawings embodiments which are presently preferred. It should be understood, however, that the invention is not limited to the precise arrangements and instrumentality shown.

In the drawings.

DETAILED DESCRIPTION OF THE INVENTION

Figure 2:
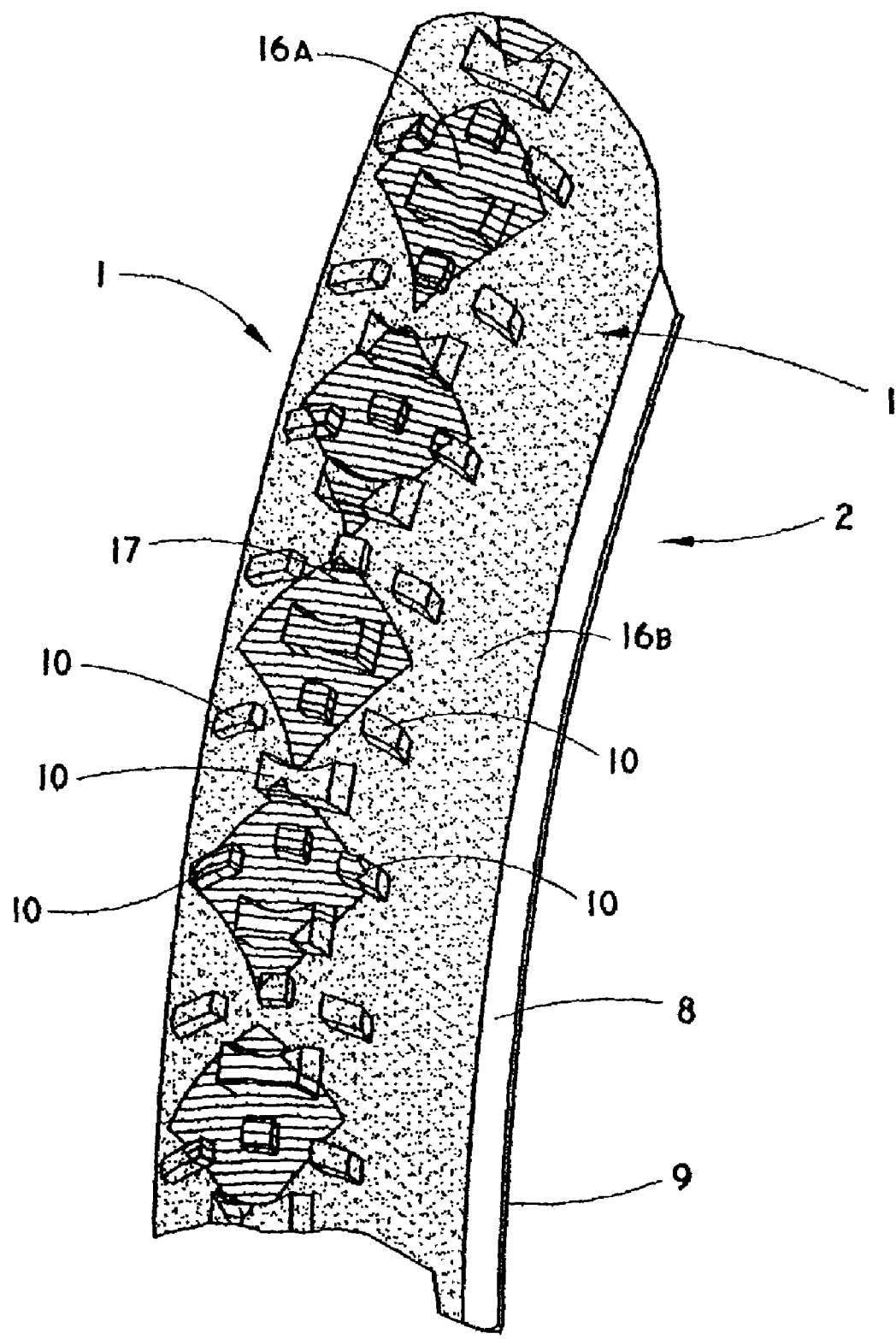
FIG. 2 is an enlarged perspective view of a portion of a bicycle tire showing the skin of FIG. 1 applied thereto.
Figure 4:
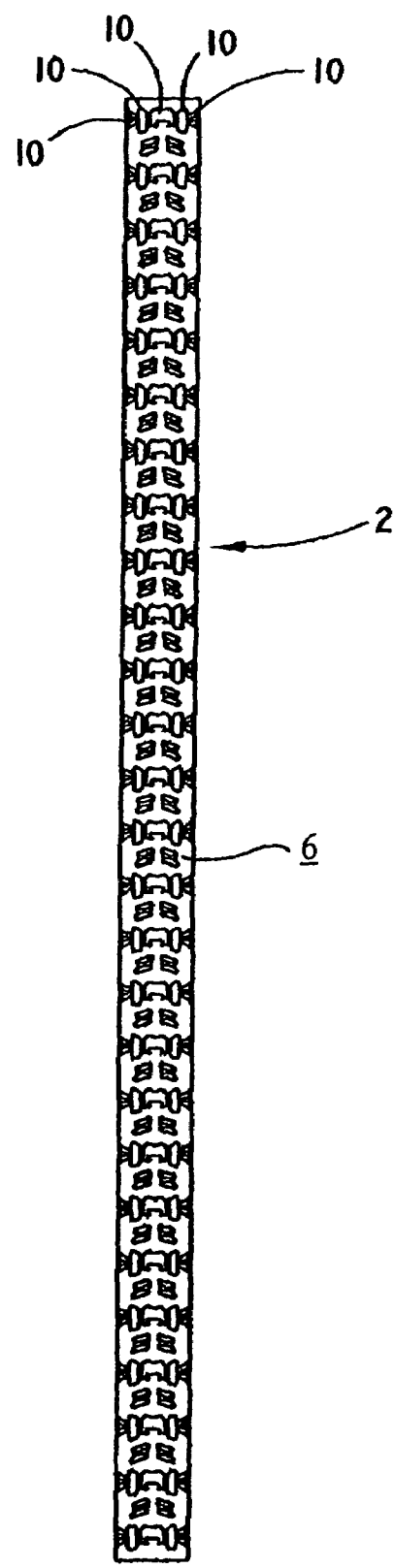
FIG. 4 is a fragmentary top plan view of a portion of a partially cured standard bicycle tire.
Figure 5:
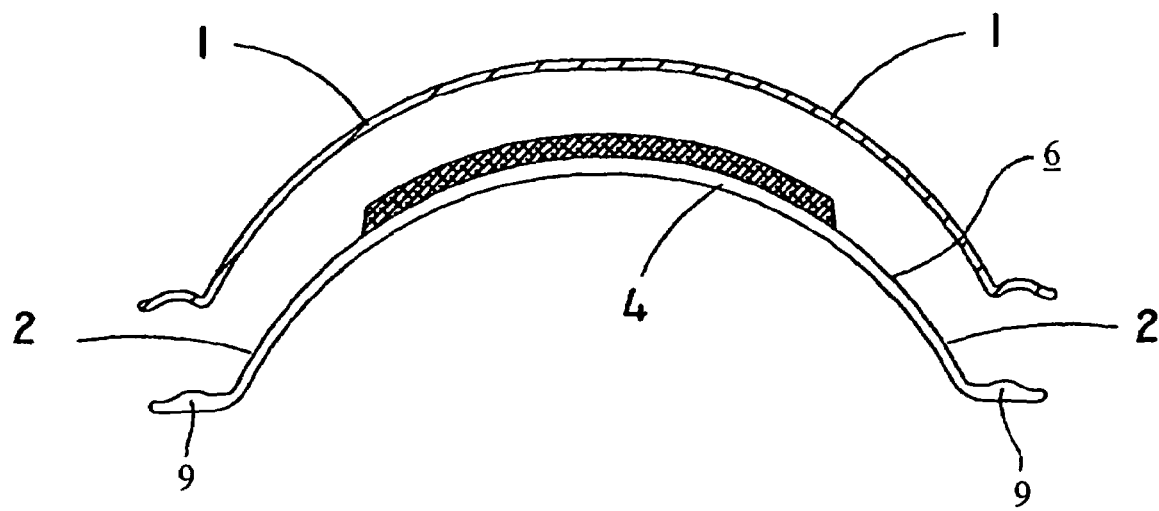
FIG. 5 is a sectional view of a partially cured bicycle tire illustrating the initial stage of application of the skin of FIG. 3.

The present invention relates to a base tire or tire 2 having an exo-belt skin or skin 1 which is applied to the external surface thereof, as described more fully herein below. In the present embodiment, a standard or specialty bicycle tire 2 is shown in FIGS. 2, 4 and 5 to illustrate the invention. It should be understood, however, that the skin 1 could be applied to other types of tires including other types of bicycle tires, motorcycle tires, automobile tires or any other circumferential type of tire, if desired. It is the primary intention of the skin 1, to enhance the visual interest or appeal of the tire 2 and to improve wear and performance, however, other advantages of having the skin 1 on a tire 2 will hereinafter become apparent.

Figure 6:
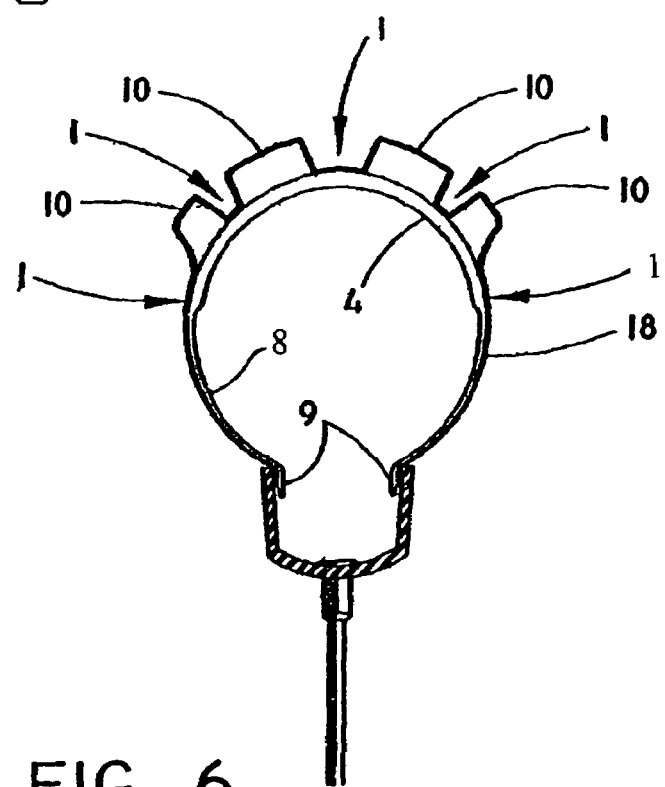
FIG. 6 is a sectional view of a rim-mounted bicycle tire with the skin applied thereto.

As best shown in FIGS. 5 and 6, the base (partially cured) tire or tire 2 (shown in radial cross-section) has a circumferential ply or base 4 with an outer circumferential surface 6, a pair of spaced apart annular side walls 8 at the distal ends of the base 4, a pair of rim engaging annular beads 9 on the distal ends of the side walls 8, and a tread pattern extending along the outer circumferential surface 6. The tread pattern of the present embodiment includes a plurality of spaced tread members 10, each of which extend radially outwardly from the outer circumferential surface 6 of the base 4. The specific tread pattern for a particular tire will vary depending upon the style and type of tire and some tires may not include a tread pattern at all. In addition, the number of plies of the tire 2 may vary to include multiple plies such as 3 ply, 4 ply, 5 ply, 6 ply, etc., in some applications. Bicycle tires of the type illustrated by FIG. 5 are typically formed utilizing a rubber mixture containing about 75% by weight of natural rubber and about 25% by weight of synthetic rubber. However, the percentages of the natural rubber and synthetic rubber of the mixture may vary in particular applications. In addition, in the case of some bicycle tires, reinforcing fibers may be added to the rubber mixture to improve performance. Typically, when such reinforcing fibers are added to the mixture, the mixture is referred to as a "3D compound". The reinforcing fibers may comprise any suitable fiber, preferably mono-filament fiber, such as Kevlar®, which may be crushed and mixed into the rubber mixture. Kevlar® is an aromatic polyamide or aramid mono-filament fiber, as is know by one having ordinary skill in the art. Typically, such 3D compounds include approximately 3% by weight of the reinforcing fibers. However, the percentage of reinforcing fibers in the 3D compound may be less than or greater than 3% for particular applications.

Figure 3:
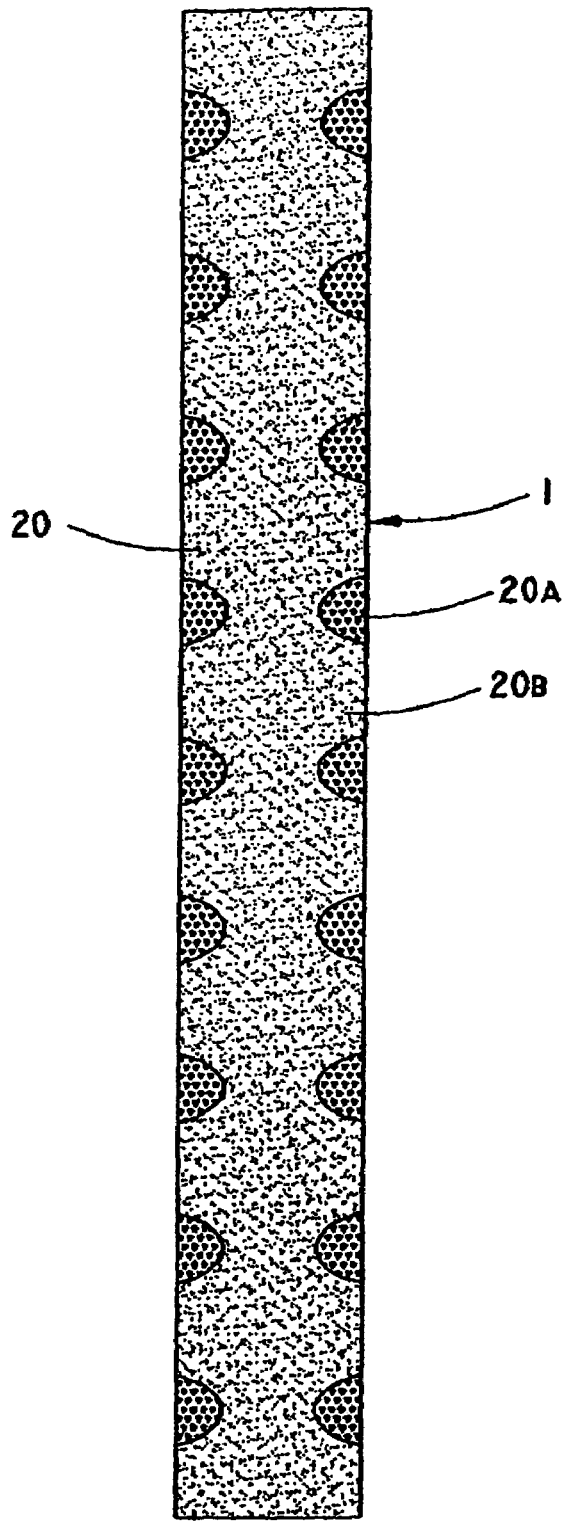
FIG. 3 is a fragmentary top plan view of a skin for a tire in accordance with a first alternative embodiment of the present invention.

As shown in FIGS. 1–3, 5 and 6, the present invention comprises a skin 1, which is adapted to be permanently installed upon or applied to at least a portion of the outer periphery of a base tire 2. In the preferred embodiment, as best shown in FIG. 3, the skin 1 is generally comprised of an elongated belt or strip which is substantially the same length as the circumferential dimension of the outer circumferential surface 6 of the tire 2. However, the skin 1 could have a length which is greater than or less than the circumference of the outer circumferential surface 6 of the tire 2. The length will be determined by the aesthetic and performance characteristics one wishes to impart to the tire 2 through the use of the skin 1. For example, the skin 1 of the preferred embodiment, shown in FIG. 3, wherein the skin 1 is a belt or strip, enhances aesthetic and visual as well as the performance characteristics of the tire 2 around the entire circumference of the tire 2. In an alternative embodiment, best shown in FIG. 1, the skin 1 is a continuous loop which enhances both the aesthetic and performance characteristics of the entire tire 2. It is also contemplated that the skin 1 may be for covering only a segment of the tire 2 to achieve desired characteristics for the tire 2.

The skin 1 of the preferred embodiment preferably has a width that encompasses the entire width of the tread pattern and each side wall 8 of the tire 2 extending from one bead 9 to the other bead 9. In other words, it is preferred that the entire exposed outer peripheral surface of the tire 2 be covered by the skin 1. It is contemplated, however, that the width of the skin 1 may be less than that of the preferred embodiment. For example, the skin 1 could be configured to overlie and cover at least a portion of only one of the side walls 8 of the tire 2 or just the tread members 10 and outer circumferential surface 6 of the tire 2 (and not the side walls 8). Again, the width of the skin 1 will depend on the visual and performance characteristics one would like to impart to the tire 2. Since one of the functions of the skin 1 is decorative, the width of the skin 1 and the portions of the tire 2 on which the skin 1 is applied will be determined by the visual effect to be created. The decorative function of the skin 1 will be discussed more fully below.

Additional factors to be considered in determining the length and width of the skin 1 are the added weight and cost of the skin 1. Inasmuch as rotational weight, particularly at the outer circumference of a tire, dramatically increases the amount of work required to increase the rotational speed of the tire, minimizing the rotational weight is important to overall tire performance. Accordingly, the skin 1 must be carefully tailored to balance between the added tire weight and the aesthetic and performance purposes and visual effect sought to be achieved. Whereas in the preferred embodiment, the skin 1 is intended to enhance the aesthetic characteristics of the tire 2 around the entire outer periphery of the tire 2, one may desire that the visual aesthetic characteristics be more locally limited on the outer circumferential surface 6 and tread members 10 of the tire 2.

Figure 1:
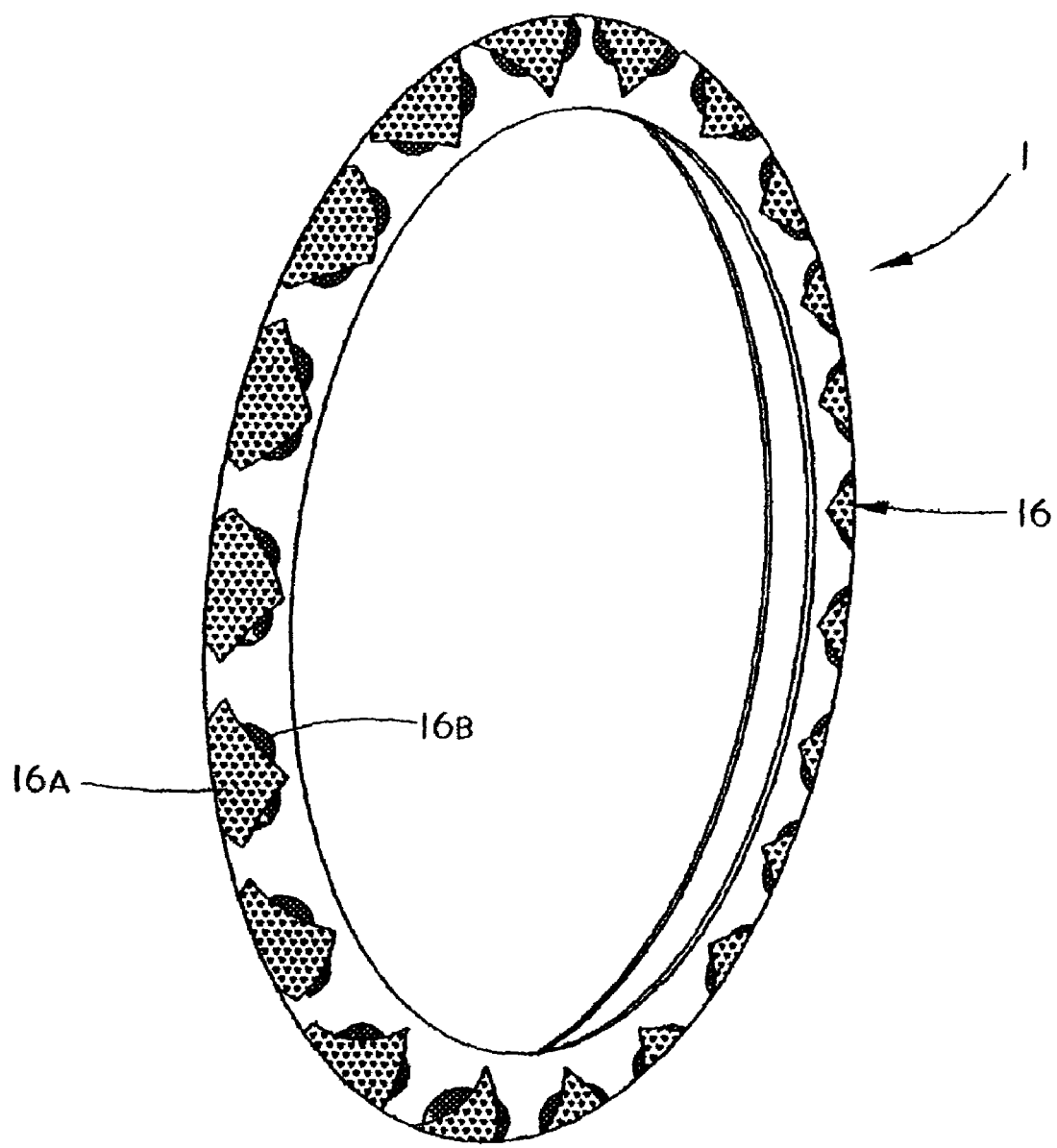
FIG. 1 is a perspective view of a cover or skin for a tire in accordance with a preferred embodiment of the present invention.

As best shown in FIGS. 1 and 3 the skin 1 preferably has visual characteristics that extend throughout at least some portion of the skin 1. More preferably, the visual characteristics could extend throughout the entire surface of the skin 1. Preferably, the skin 1 extends from the base 4 to embrace the entire outer periphery of the tire 2 including the outer circumferential surface 6 and the entire surface of each of the tread members 10. The skin 1 preferably extends the entire length of the tread members 10, including the end portion, so as to completely cover the entire periphery of each tread member 10 once the skin 1 has been applied to the tire 2.

Preferably, the skin 1 which, before being applied to the base tire 2 is in a green or partially cured state, is made of a composite rubber mixture, preferably a blend of about 25% synthetic rubber, such as styrene-butadiene rubber and about 75% natural rubber. Preferably, the composition of the skin 1 is the same as or similar to the composition of the base tire 2 to which the skin 1 is applied. In this manner, bonding between the skin 1 and the base tire 2 is enhanced. Additionally, a combination of rubber and a polymeric material could be used. Other materials known to those skilled in the art could be used, if desired. In the preferred embodiment, reinforcing fibers are added to the skin 1 to enhance performance. Preferably, the reinforcing fibers are of the monofilament type, such as Kevlar® and are crushed and mixed into the rubber mixture. The reinforcing fibers, preferably the aromatic polyamide mono-filament fibers, could comprise between 1–12% by weight of the rubber mixture but preferably comprise about 8% of the mixture. The material(s) elected must provide both durability and light weight to the skin 1 and be such that the skin 1 will bond to the tires during production. Preferably the skin 1 is limited in thickness to that which is sufficient to permit effective transfer and retention of the desired image onto the desired portion of the outer periphery of the tire 2 and provide the desired performance characteristics. However, it is also contemplated that the skin 1 be constructed of a substantial thickness so as to help protect the tire 2 from wear and abrasions.

In some applications, at least the exposed outer surface of the skin 1 could be coated with a protective coating (not shown) to protect the skin 1 from the effects of wear and abrasion both following manufacture (in transport, etc.) and during use. Preferably the protective coating is urethane, but it is contemplated that the protective coating could be any transparent or translucent, durable, flexible material with sufficient bonding characteristics to adhere to the skin 1 under the conditions of anticipated use. Preferably, the protective coating selected also provides protection to the skin 1 from ultraviolet light and the like.

As best shown in FIGS. 1 and 2, the skin 1 preferably includes a decorative pattern 16 which may be a pattern incorporating the trade dress of a particular manufacturer, retailer or the like (not shown) or some other pattern such as a snake skin pattern and/or other natural or non-natural patterns or the like (not shown), as examples. The decorative pattern 16 may comprise virtually any pattern or simply one or more solid colors. To enhance the safety and aesthetic characteristics of the tire 2, the decorative pattern 16 may include a phosphorescent material 17, as shown in FIG. 2, applied in a pattern such as stripes as shown in FIG. 2, or as a solid color as shown in FIG. 1. The decorative pattern 16 may also include reflective or retro-reflective particles or beads such as Scotchlite® from 3M to enhance the visual and safety aspects of the tire 2. It should be understood that the decorative pattern 16 can be incorporated on or into the skin 1 itself, or into the protective coating (not shown), or both. The retro-reflective material could be added to the rubber composition of the skin 1 and/or could be applied to the ink used to form the decorative pattern of the skin 1. The decorative pattern 16 could also include specifically directed advertising related or unrelated to the tire 2, bicycle (not shown) or the like. The decorative pattern 16 may be comprised of a plurality of discrete decorative patterns 16a, 16b, as shown in FIGS. 1 and 2. The decorative pattern 16 need not be distributed over the entire skin 1, but may be distributed over only a portion of the skin 1. For example, a portion of the decorative pattern 16 could be located only on the portion of the skin 1 that overlies the side walls 8 of the tire 2.

The decorative pattern 16 is visible on at least a portion of the peripheral surface of the skin 1, i.e., it is applied to the surface of the skin 1. Preferably, the skin 1 is produced with the intended colored design printed thereon. Alternatively, it is to be understood that the decorative pattern could be embedded within a portion of the skin 1.

The skin 1 may be made by any of several methods well known to those skilled in the art. Most preferably, the skin 1 is made by creating a thin sheet of rubber composition material (not shown) which is partially cured. Preferably, the skin 1 will have a thickness in the range of 0.5 to 1 millimeter and more preferably is in the range of 0.5 mm to 0.75 mm. Preferably, a membrane (not shown) is applied to one side of the skin 1 to enable the skin 1 to be handled more easily. It should be understood that the use of a membrane for handling is not necessary. The decorative pattern 16 is printed on the skin 1 using any of a number of techniques known to those skilled in the art, but preferably is printed using offset and other known printing techniques which are well-known. Preferably the ink applied to the skin 1 is sufficiently rubberized or flexible to be able to withstand the rigors of tire use, including expansion during inflation and flexure during use based on the cycle of alternate tension/compressive stresses created on the tire during normal use.

In an alternative embodiment, at least some of the three dimensional tread members 10 will be positioned on the outer circumferential surface 6 in a pattern that will correspond in theme or design to the design printed two dimensionally to the skin 1. In a further alternative embodiment, at least some of the tread members 10 will be shaped to correspond in theme or design to the design printed on the skin 1. It is contemplated that the tread members 10 may be both shaped and positioned so to correspond in design or theme to the design printed on the skin 1.

The skin 1 is preferably applied to the base tire 2 during the tire manufacturing process. As stated above, the skin 1 is in a partially cured, green state at the time it is constructed. Preferably the skin 1 is applied to the tire 2 when the tire 2 is also in a green or partially cured state and the tire 2 and skin 1 are thereafter fully cured (vulcanized) together to form an assembled whole. The molding equipment used for curing the tire 2 and skin 1 is conventional equipment used during tire manufacture and well known to those skilled in the art. Other equipment and/or methods may be employed to secure the skin 1 to the base tire 2. Preferably a BOM vertical mold is used but other molds such as a toroidal clam shell mold or the like could be used, if desired. Preferably, the partially cured skin 1 and the partially cured base tire 2 are placed in the mold and thereafter the expandable interior mold bladder is expanded using steam or other such pressure to cause the skin 1 and the base tire 2 to expand into the mold with the skin 1 facing the inner surface of the mold. Further expansion of the mold bladder causes the skin 1 and base tire 2 to conform to the inner surface of the mold thereby creating the desired tire shape, texture and tread pattern. The bladder is retained in place by the pressure for a predetermined time period during which the tire 1 and the skin 2 are fully cured or vulcanized by heat and pressure transmitted to the bladder via steam or other well known methods. Preferably, the outer surface of the mold is also heated in a manner known to those skilled in the art to enhance curing of the combined skin 1 and base tire 2 and to prevent undercuring or overcuring of the tire 2 or skin 1.

Preferably, the skin 1 is initially positioned in the mold so that upon expansion of the mold bladder, the pattern of the skin 1 is in proper registry with the tread pattern imparted to the skin 1 and base tire 2 by the inner surface of the mold. It will be recognized by those skilled in the art that the skin 1 will, through the curing process, become fused or bonded to the base tire 2 due to the combination of both the skin 1 and tire 2 and the final curing process. Thus, when the partially cured tire 2 and partially cured skin 1 are subjected to the remainder of the curing process to which a tire 2 is normally subjected and which is well known to those skilled in the art the skin 1 becomes part of the tire 2. The bonding of the base tire 2 and the skin 1 is enhanced due to the composition of the skin 1 being the same as or similar to the composition of the base tire 2. It is also preferred that the skin 1 is applied prior to fully curing the tire 2 to help avoid a costly double cure process and to create a permanent bond between the skin 1 and the tire 2 so that the visual characteristics of the tire remain aligned with or in registry with the tire 2 in both the circumferential and axial directions. It should be understood, however, that for some applications, the skin 1 may be applied to the tire 2 after the tire 2 is fully cured using an adhesive or some other direct or intermediate bonding agent or process.

As shown in FIG. 3, the external surface 18 of the skin 1 may include a surface texture 20 for improving adhesion between the skin 1 and the trail and/or road surface(s) to which the skin 1 is exposed when on a tire 2. The surface texture could be imparted by the mold during the curing process or could be created by adding a textured material to the rubber composition of the skin 1. The primary effect of the surface texture 20, which will preferably cover portions of or the entire surface of the tread members 10 as well as lie within the interstitial region between the tread members 10 and the sides of the tread members 10, is to enhance the ability of the tire 2 to grip trail and/or road surfaces, to shed mud, and/or to channel water away from the tire 2. As shown in FIG. 3, the surface texture 20 may include a plurality of different textures 20a, 20b, or the surface texture 20 may encompass only a single texture (not shown). The surface texture 20 may be made up of virtually any combination of bumps, knobs, depressions, ridges, etc. that will provide a gripping, mud shedding, or water channeling characteristic to the skin 1. As will be recognized by those skilled in the art the surface texture 20 may also serve to enhance the aesthetic characteristics of the tire 2.

Again, it should be noted that the skin 1 is intended to cover the tread members 10 in their entirety, as contrasted to prior techniques for decorating tires, such as that disclosed in U.S. Pat. No. 5,904,794, which is incorporated herein in its entirety by reference. This is advantageous not only for improving the aesthetics of the tire 2 of the present invention over the prior art by permitting the skin 1 to cover all or substantially visual surfaces of the tire 2, but also permits the design to incorporate the tread members 10 into, for example, a pattern matching the decorative pattern 16 or surface texture 20 into image specific treads. Additionally, covering the tread members 10 with the skin 1 can cause the skin 1 to serve as a reinforced exo belt which also improves the performance and wear resistance of the tire 2 over prior art designs particularly if the reinforcing fibers have been used to form the skin 1.

It will be appreciated by those skilled in the art that changes could be made to the embodiment described above without departing from the broad inventive concepts thereof. It should also be understood that the above description was directed to a bicycle tire 2 for purposes of providing one example of the types of tires to which the present invention may be applied. It is clearly contemplated that the present invention may be applied to any type of tire, including, but not limited to, all types of bicycle tires including sew-ups, tubeless and clincher tires, in addition to motorcycle tires, automobile tires, heavy equipment tires, etc. It is understood, therefore, that this invention is not limited to the particular embodiments disclosed, but is intended to cover all modifications within the scope and spirit of the invention.

We claim:

1. A method of making a tire with a skin covering at least a portion of the outer peripheral surface of the tire comprising the steps of:

(a) providing a partially cured base tire;

(b) providing a partially cured skin including a predetermined percentage by weight of crushed reinforcing fiber comprised of a mono-filament aramid fiber material;

(c) printing a decorative pattern onto an entire exposed surface of the partially cured skin;

(d) installing the partially cured base tire and the partially cured skin in a tire mold with the skin engaging and covering an entire outer surface of the base tire and with the skin facing an inner surface of the mold, the decorative pattern being positioned at a predetermined location;

(e) applying heat and pressure to the base tire to press the skin and the base tire against the inner surface of the mold;

(f) maintaining the heat and pressure for a predetermined time period to vulcanize and bond together the base tire and the skin, thereby forming the tire, the decorative pattern being visible on at least a portion of an external peripheral surface of the tire; and (g) applying one of a transparent and translucent protective coating over the external peripheral surface of the tire.

2. The method as recited in claim 1 further comprising the step of heating an outer surface of the mold during the predetermined time period to promote the vulcanization and bonding together of the base tire and the skin.

3. The method as recited in claim 1, wherein the decorative pattern includes a retro-reflective material therein and the protective coating is a urethane material.

4. The method as recited in claim 1, wherein the mold is a vertical press mold.

5. The method as recited in claim 4, wherein the heat and pressure are applied by an expandable bladder which engages and presses against the partially cured base tire.

6. The method as recited in claim 1, wherein the partially cured base tire and the partially cured skin have substantially the same rubber based composition.

7. The method as described in claim 1, wherein the predetermined percentage of reinforcing fiber is less than 12% by weight of rubber mixture of the skin.

8. The method as recited in claim 1 wherein the decorative pattern printed onto the partially cured skin in step (c) is a desired image.

9. The method as recited in claim 1 wherein the decorative pattern printed onto the partially cured skin in step (c) is comprised, at least in part, of an advertisement.

10. The method as recited in claim 1 wherein the decorative pattern is printed onto the partially cured skin in step (c) using an offset printing technique.

11. The method as recited in claim 1 wherein the decorative pattern is printed onto the partially cured skin in step (c) using a flexible ink.

* * * * *